United States Patent [19]

Robinson et al.

[11] Patent Number: 4,576,636

[45] Date of Patent: Mar. 18, 1986

[54] PROCESS FOR BENEFICIATING OXIDIC ORES

[75] Inventors: Michael Robinson, Wooton; Harry B. Wilson, North Thoresby, both of England

[73] Assignee: SCM Chemicals Limited, London, England

[21] Appl. No.: 234,987

[22] Filed: Feb. 17, 1981

[30] Foreign Application Priority Data

Feb. 19, 1980 [GB] United Kingdom ................. 8005517

[51] Int. Cl.$^4$ ............................................. C01G 49/10
[52] U.S. Cl. ....................................... 75/1 R; 75/112;
75/113; 75/121; 423/3; 423/59; 423/63;
423/74; 423/75; 423/111; 423/113; 423/137;
423/149; 423/292; 423/297; 423/341; 423/343;
423/492; 423/493; 423/496
[58] Field of Search ..................... 423/69, 74, 75, 149,
423/493, 633, 23, 111, 113, 137, 492, 496, 59,
63, 292, 297, 341, 343; 75/1 R, 1 T, 112, 113,
121

[56] References Cited

U.S. PATENT DOCUMENTS

| | | | |
|---|---|---|---|
| 2,030,868 | 2/1936 | Hart | 423/149 |
| 2,752,301 | 6/1956 | Cooper | 423/149 |
| 3,240,557 | 3/1966 | Lerner | 75/112 |
| 3,466,169 | 9/1969 | Nowak | 75/112 |
| 3,816,093 | 6/1974 | Hildreth | 75/1 T |
| 3,865,920 | 2/1975 | Dunn | 423/149 |
| 4,094,954 | 6/1978 | Bonsack | 423/149 |
| 4,174,381 | 11/1979 | Reeves | 423/633 |
| 4,279,640 | 7/1981 | Robinson | 75/1 R |
| 4,288,411 | 9/1981 | Holland | 423/149 |

*Primary Examiner*—Gregory A. Heller
*Assistant Examiner*—Robert L. Stoll
*Attorney, Agent, or Firm*—Thomas M. Schmitz

[57] ABSTRACT

A process for the beneficiation of an iron-containing material is carried out by first chlorinating the iron-containing material. Oxidation of ferrous chloride in the effluent gas from the chlorination is carried out under controlled conditions of oxygen supply so that more than 50% but less than 100% of the ferrous chloride is oxidized. In this way chlorine gas is separated from the process stream in a relatively pure form which can be utilized in a continuous process by recycle to another chlorination.

19 Claims, No Drawings

PROCESS FOR BENEFICIATING OXIDIC ORES

BACKGROUND OF THE INVENTION

1. Field of Invention

This invention relates to the beneficiation of oxidic ores, that is, to the removal of values of an undesired constituent, normally a metal, from an ore thereby substantially raising the residual content of another, desired, constituent, usually a metal, present in the ore. Such values will usually be present in the ore in the form of oxides. The invention also relates to the beneficiation of industrial oxidic waste materials on a similar basis.

According to one aspect thereof the present invention more particularly relates to beneficiation of an iron-containing oxidic ore by selectively chlorinating iron values in the ore and removing the resulting iron chloride from the ore residue in the form of a vapour.

2. Brief Description of the Prior Art

British Pat. No. 1359882 discloses a process for the benefication of an ore containing as major constituents titanium and iron oxides, which process comprises forming a mixture containing the ore and carbon, the carbon content of the mixture being in the range of from 20% to 40% by weight, and treating the mixture in a fluidised bed reactor at a temperature in the range of from 800° C. to 1000° C. with a treatment gas which comprises from 20% to 50% by volume of chlorine and from 0% to 10% by volume of oxygen. In order to reduce the quantity of chlorine required it is preferred to operate this process so that the predominant chlorination product is ferrous chloride.

The selective chlorination of the iron values in an ore also containing titanium values according to the process described in British Pat. No. 1359882 may be explained theoretically, on thermodynamic principles, to involve the initial chlorination of both the titanium and iron values of the ore with the preferential reoxidation of the titanium chloride so formed by the oxygen released in the course of the chlorination reaction.

Such a theory does not lend itself to the expectation that the benefication process similar to that described in British Pat. No. 1359882 could be applied to a wide range of oxidic ores containing, as major constituents, besides iron values, normally chlorinatable values of a wide range of metals other than titanium. In many cases vapour pressure considerations would lead to the expectation that the desired selective removal of iron values could not be achieved. Nevertheless, it has now been found, according to the present invention, that an excellent selectivity with respect to the removal of the iron values in the ore may be achieved, under the particular conditions used, over a wide range of ores as will be fully described hereafter. The wide ranging application of the present invention leads to the belief that a different mechanism, to that based on the thermodynamic principles mentioned above, is operable under the particular process conditions utilised in the practice of the present invention.

SUMMARY OF THE INVENTION

The present invention has particular utility in the provision of raw materials for the production of special steels, containing, for example, one or more of vanadium, tantalum, niobium, molybdenum, chromium, tungsten, nickel or titanium. Low grade oxidic ores containing values of one or more of the above mentioned elements together with a large proportion of iron values are widely available but are not in use in the production of special steels in view of the lack of an efficient and practicable beneficiation process by which the iron values or a proportion of them, might be removed. Examples of such ores which are not at present utilised for this purpose are South African vanadiferous bauxite and North American chromite ores. The present invention provides a practical and efficient means of beneficiating such ores either by removal of a limited proportion of the iron values from the bulk of the ore or, preferably, by the removal of a large proportion, or substantially all, of the iron values from a portion of the one to produce a highly beneficiated portion of ore which may be blended back into the remainder of the ore in the proportion required to give the desired average degree of beneficiation. The present invention may also be applied outside the field of special steel production, one example of such an application being the beneficiation of bauxite for the manufacture of aluminium metal. The invention may be applied, for example, to the pretreatment of bauxite to reduce the iron content thereof to give a fairly pure bauxite to be chlorinated to produce pure AlCl$_3$ vapour which may be converted to aluminium metal by conventional means.

The present invention also provides, irrespective of the identity of the ore values remaining in the ore residue a new and unexpectedly efficient combination of process steps for the processing of ferrous chloride produced by the chlorination of iron values in the ore and for the recovery and recycling of the chlorine used and, in this aspect thereof the present invention is deemed to apply inter alia to the beneficiation of iron containing titaniferous ores despite such a process already being the subject of British Pat. No. 1359882.

DETAILED DESCRIPTION OF THE PREFERRED EMBODIMENTS OF THE INVENTION

According to one aspect thereof the present invention therefore provides a process for the beneficiation of an iron-containing oxidic material characterised by the following combination of features, (a) chlorinating iron values of the material by forming a fluidised bed of particles of the material in admixture with particles of carbon, the carbon being present in the fluidised bed in at least sufficient quantity to react with any oxygen added to or evolved in the bed, and the temperature of the fluidised bed being from 800° C. to 1100° C., admitting to the fluidised bed a chlorine containing gas giving a concentration of chlorine of from 20% to 60% by volume of gases added to the bed and reacting the chlorine with iron values present in the ore to produce iron chloride predominantly in the form of ferrous chloride, (b) contacting the gaseous effluent from the fluidised bed in which iron values in the material have been chlorinated; hereafter referred to as the chlorination fluidised bed; the said effluent containing the said ferrous chloride in vapour form, with a quantity of oxygen controlled to oxidise more than 50% and preferably less than 100%, on a molar basis, of the ferrous chloride in the effluent according to the equation

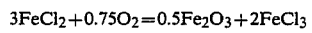

$$3FeCl_2 + 0.75O_2 = 0.5Fe_2O_3 + 2FeCl_3$$

and to produce a mixture of iron chloride (which term is used to include ferrous chloride and/or ferric chloride as appropriate) and ferric oxide, (c) condensing iron chloride contained in the said mixture and separating the condensed iron chloride from the gaseous effluent, (d) revolatilising condensed iron chloride, (e) contacting revolatilised iron chloride with oxygen to oxidise the iron chloride so contacted to ferric oxide with the evolution of chlorine and (f) recycling chlorine so evolved, as chlorine containing-gas, to the chlorination fluidised bed.

By producing, according to step (a) above, iron chloride predominantly, that is to an extent of more than 50% on a molar basis, in the form of ferrous chloride the volume of chlorine required for the chlorination, per mole of iron oxide removed from the ore, is reduced.

By oxidising less than 100% of the ferrous chloride in the effluent from the chlorination fluidised bed to ferric oxide and ferric chloride, any chlorine which may be present, and which would represent a potential loss to the process, is scavenged by reacting with at least some of the residual ferrous chloride in that gaseous effluent to form ferric chloride.

By converting the ferrous chloride in the gaseous effluent from the chlorination fluidised bed at least partly to ferric chloride, and by condensing that ferric chloride, a separation of the chlorine from inert gases and carbon oxides is achieved without the loss of chlorine associated with chlorine purification processes, particularly, without liquefaction of the chlorine while reducing problems normally associated with the handling of ferrous chloride. The concentration of the chlorine recovered by the oxidation of the subsequently revolatilised ferric chloride may be controlled by control of the quantity of inert gases allowed to be present during that oxidation.

Further preferred features of the invention contributing to the provision of an efficient process will be apparent from the following description.

The temperature of the chlorination fluidised bed is, preferably, from 800° C. to 1000° C. The carbon in the chlorination fluidised bed is preferably substantially free of volatile materials and is present, preferably, in from 20% to 40% of the total weight of the ore and carbon. The concentration or chlorine-containing gas is, preferably, from 20% to 50% and, particularly preferably, from 30% to 50% by volume. The required temperature of the chlorination fluidised bed is, preferably, at least partially attained and/or controlled by the addition thereto of a suitably limited quantity of oxygen which may be at least partly in the form of an oxygen-containing gas. The oxygen concentration in the total gaseous input into the chlorination fluidised bed must not exceed 10% by volume. Preferably the chlorine, also containing any necessary quantity of inert gases to maintain the required chlorine concentration, is used as the fluidising gas. Under these conditions to attain the production of iron chloride predominantly in the form of ferrous chloride the expanded depth of the chlorination fluidised bed is, preferably, at least 1 meter and is, particularly preferably not more than 2.75 for example, from 1.5 to 2.5, meters. Preferably the iron chloride produced in the course of the ore chlorination is to the extent of at least 75%, particularly preferably, to the extent of more than 85% on a molar basis, in the form of ferrous chloride. The particle size of the ore is, preferably, such that it contains no particles outside the range of $75 \times 10^{-6}$ m to $1000 \times 10^{-6}$ m, particularly preferably $75 \times 10^{-6}$ m to $500 \times 10^{-6}$ m, in diameter with a weight mean average particle size in the range of $150 \times 10^{-6}$ m to $400 \times 10^{-6}$ m particularly preferably, $150 \times 10^{-6}$ m to $250 \times 10^{-6}$ m, in diameter.

The particle size of the carbon, is, preferably, such that it contains substantially no particles outside the range of $75 \times 10^{-6}$ m to $4000 \times 10^{-6}$ m, particularly preferably, $75 \times 10^{-6}$ m to $2000 \times 10^{-6}$ m in diameter with a weight mean average particle size of $500 \times 10^{-6}$ m to $1200 \times 10^{-6}$ m, particularly preferably, $500 \times 10^{-6}$ m to $800 \times 10^{-6}$ m, in diameter.

According to the invention the gaseous effluent from the chlorination fluidised bed is contacted with oxygen, which may be at least partly in the form of an oxygen containing gas, in a quantity controlled to oxidise, only to the desired extent, the ferrous chloride in the effluent. Allowance is preferably made, in arriving at the quantity of oxygen required, for the oxygen requirement represented by any still entrained carbon blow-over and any carbon monoxide present from the chlorination fluidised bed. Preferably at least 65%, particularly preferably at least 70%, of the ferrous chloride, on molar basis is oxidised. Preferably at least 5% and particularly preferably at least 10% of the ferrous chloride on a molar basis is unoxidised. A limited quantity of ferrous chloride may be tolerated in the effluent gas even after the oxidation thereof and the reaction thereof with any free chlorine in the effluent gas since the control of the quantity thereof by virtue of the oxidation reaction, which occurs substantially instantaneously, may act to maintain the partial pressure of the ferrous chloride at a sufficiently low value to reduce problems of accretion normally associated with the presence of vaporous ferrous chloride. Preferably, the partial pressure of the ferrous chloride is maintained relative to the temperature of the effluent gas, after contact with oxygen, so that the dew point of the ferrous chloride is not attained. Particularly preferably, the partial pressure of the ferrous chloride is maintained so that the dew point of the ferrous chloride is at least 30° C. below the temperature of the gaseous effluent, after contact of the effluent with oxygen at this stage of the process.

The oxygen to be contacted with the gaseous effluent from the chlorination fluidised bed is, preferably, introduced at such a point that carbon entrained in the effluent, or a proportion of it, has first become disentrained by virtue of a relatively low upward gas velocity, the disentrained carbon thereby being prevented from reacting with the oxygen. Preferably the vessel enclosing the chlorination fluidised bed provides a free space above the level of the fluidised bed. Preferably the free space occupies, during the operation of the fluidised bed, more than 50%, particularly preferably from 65% to 95% of the total height of the vessel measured upwardly from the bed support means. To ensure that ferric oxide formed as a result of contact of the gaseous effluent with oxygen cannot fall back into the chlorination fluidised bed it is preferred to provide a relatively high gas velocity at the point of formation of the ferric oxide and thereafter by, for example, a reduction in the cross-sectional area of the flow path of the gaseous effluent containing the ferric oxide. Preferably, the vessel enclosing the chlorination fluidised bed possesses an upper portion having a reduced cross-section, the oxygen being introduced at or near the commencement of the this reduced cross-sectional section.

The ore chlorination reaction is not autothermal in practice but requires the supply of heat thereto to prevent a gradual decrease in temperature. Part of the heat supplied is generated by the combustion of carbon necessary to the removal from the system of free oxygen originally present in the ore in chemically bound form, which oxygen might otherwise recombine with some of the iron chloride formed. A part of the heat supplied is preferably provided by preheating the ore and, preferably also, the carbon. By such a means a thermal balance may be attained in the chlorination fluidised bed.

The effluent gases from the chlorination fluidised bed contain a considerable quantity of heat. The additional heat which would be generated by the complete oxidation of the ferrous chloride to ferric oxide in the effluent gas and the combustion of blow-over carbon and carbon monoxide present therein poses a problem of heat control which would be difficult to solve in the large diameter reactors normally used for operation on a commercial scale.

The complete oxidation of ferrous chloride to chlorine and ferric oxide involves the overall evolution of heat to the extent of 59 kilo calories per mole of ferrous chloride if the oxidation is conducted at a temperature of, for example, 1000° C. and this would be sufficient, in the absence of special precautions, to raise the temperature to an unacceptable degree. In contrast, the overall evolution of heat involved in the controlled oxidation of ferrous chloride to produce a mixture of ferric oxide and ferric chloride, as provided herein, is only 37 kilocalories per mole of ferrous chloride. This lesser evolution of heat is susceptible to control by means to be described hereafter.

The gaseous effluent, containing ferric oxide and iron chloride may be treated by allowing the separation of the ferric oxide while substantially maintaining the iron chloride in gaseous form. The ferric oxide may be separated by means of, for example, a cyclone. The remaining gases may be allowed to cool, or may be cooled, to a temperature at which the iron chloride condenses, for example, to from 100° C. to 300° C. The condensate may be separated, for example, by means of a further cyclone.

It is a particularly preferred embodiment of this invention that the gases remaining after the condensation of the iron chloride be discarded since they have previously been scavenged of uncombined chlorine. This enables air to be used instead of oxygen for the contact of the gaseous effluent from the chlorination fluidised bed since the inert gases thereby introduced are removed with the discarded gases. The presence of the inert gases also assist in heat control. The chlorine used to chlorinate the ore is substantially retained in chemically combined form in the iron chloride condensate and does not require any substantial purification, apart from recovery from its chemical combination with iron and the separation of any residual iron oxide therein, to enable it to be recycled to the chlorination of further ore.

According to the invention the recovery of the chlorine is accomplished by revolatilising the iron chloride and contacting the revolatilised iron chloride with oxygen to form ferric oxide and chlorine.

The revolatilisation of the iron chloride may be accomplished by contacting it with hot gases which gases, preferably, have a temperature from 800° C. to 1100° C. The hot gases are preferably derived from the combination of carbon with oxygen. Preferably the carbon is substantially free of volatile materials. Suitably, the gases are produced by forming a fluidised bed; hereafter referred to as the chlorine recovery fluidised bed to distinguish it from the chlorination fluidised bed; of a mixture of particles of carbon and particles of an inert material and introducing oxygen into the bed, suitably, as the fluidising gas. The iron chloride is, preferably, passed into the free space above the surface of the chlorine recovery fluidised bed where it is volatilised at least in part. A proportion of the iron chloride may fall on to the surface of the bed, if of a particle size too large to be entrained in the rising gases from the bed, and may be vapourised in the bed.

The contact of the revolatilised iron chloride with oxygen is, preferably, conducted in like manner as that preferred for the contact of the gaseous effluent from the chlorination fluidised bed with oxygen with respect to the construction features of the apparatus used, the gas velocities used and the point of introduction of the oxygen into the combustion gas stream containing the revolatilised iron chloride. Preferably, at least a stoichiometric quantity and, particularly preferably at least a 10% molar excess of oxygen is used to oxidise the iron chloride. Since chlorine recovered in this manner is, according to the invention, recycled to the chlorination fluidised bed for which use it must have a specified concentration, the quantity of inert gases allowed to enter the chlorine recovery fluidised bed or the stream of revolatilised iron chloride is preferably controlled accordingly. For this purpose the oxygen used for the combustion of carbon in the chlorine recovery fluidised bed and/or for contact with the revolatilised iron chloride may comprise a suitable mixture of an oxygen-containing gas and additional oxygen.

Ferric oxide present in the recovered chlorine-containing gases may be removed, for example, by means of a cyclone. The gases may then be allowed to cool, or may be cooled, to, for example, 100° C. to 300° C. whereupon any iron chloride is condensed and may be removed, for example, by means of a further cyclone.

Iron oxide produced according to this invention is suitably used to produce iron oxide pellets suitable for use in a basic oxygen steel making process the pellets being, preferably, produced by a process as described in British Pat. No. 1543574.

Chlorine thus recovered is, preferably, passed through a suitable means to remove any entrained particles, such as, for example, a bag filter since such particles may otherwise cause blockages in pipework.

To reduce the tendency for iron chloride scale to deposit on the pipework through which the gaseous effluent from the chlorination fluidised bed, after contact with oxygen, is passed to the ferric oxide and ferric chloride separation means it may be necessary to cause the impingement, on the inner surfaces of the pipework of an inert particulate solid. This may be achieved by projecting the solid along the interior of the piping. The solids may be coarse grained hematite or sand for use in the pipework up to the ferric oxide separation means but should be a solid compatable with the solids in the chlorine recovery fluidised bed, where the ferric chloride recovered is passed into that bed, for use in the piping between the ferric oxide separation means and the ferric chloride separation means. Where the last mentioned fluidised bed is of beneficiate the particulate solids are preferably beneficiate. Similar precautions to prevent deposition are suitably employed in the piping through which the gaseous effluent from the chlorine recovery fluidised bed, after contact with oxygen, is passed to the ferric oxide and ferric chlorine recovery means. The use of a reduced cross-sectional upper portion in the chlorination vessel and of the chlorine recovery vessel assists in the projection of the particulate solids into pipework across the interior of the top of the those vessels, for example along a diameter of the top of those vessels. The use of inert particulate solids to prevent scale formation in pipework is described more fully in British Patent Application No. 8040046.

Reference has been made, above, to means of controlling the heat evolved during the contact with oxygen of the gaseous effluent from the chlorination fluidised bed. Such means are, preferably, provided by introducing solid ferric chloride into the gaseous effluent from the chlorination fluidised bed, preferably, at a level at least as high above the bed as the point at which the oxygen is introduced. Heat is removed from the mixture of the gaseous effluent and oxygen by virtue of the volatilisation of the ferric chloride. In combination with the expedient of controlled oxidation of the ferrous chloride this expedient assists in reducing an excessive temperature increase at this point in the process. Preferably, the residual solid iron chloride separated from the chlorine-containing gases recovered after the oxidation of the revolatilised iron chloride is introduced into the chlorinator.

A further, preferred, expedient which contributes to the efficient control of heat in the present process relates to the preparation of the mixture of ore and carbon used to form the chlorination fluidised bed and to its subsequent processing.

To reduce the need to generate heat in the chlorination fluidised bed itself it is preferred to preheat the mixture of ore and carbon. Preferably, according to the invention, the mixture of ore and carbon is preheated by causing combustion of a part of the carbon by means of a controlled quantity of oxygen, which may be provided by the use of air. While calcined petroleum coke may be used as a source of carbon this tends to be expensive. It is a particularly preferred feature of this invention, however, to utilise, as a feed, a carbon containing volatile material, for example uncalcined petroleum coke or a carbon of vegetable origin such as "char". Preferably, the carbon is calcined in the course of preheating the ore by the combustion of a part of the carbon. Preferably, the ore is treated in one stage with carbon combustion gases, mixed with combustion gases from volatile organic impurities in the carbon, and the partially preheated and treated ore is mixed, in a further stage, with uncalcined carbon of which a part is subjected to combustion to provide the combustion gases and to calcine the remainder of the carbon. Such a treatment may be conducted in a plurality of stages but is preferably conducted in two stages. Preferably the treatment is conducted in fluidised beds arranged so that at least one fluidised bed to be used for treatment of the ore with the combustion gases is situated above at least one fluidised bed to be used for the combustion of the carbon and so that those combustion gases are entrained in the fluidising gas for the upper fluidised bed. A mixture of ore and calcined carbon of vegetable origin, prepared in this manner, is particularly suitable for use in the practice of this invention. Preferably, the combustion treatment is carried out at a temperature of from 800° C. to 1100° C. and particularly preferably at a temperature of from 900° C. to 1150° C.

The particle sizes of the ore and carbon are preferably suitable for direct incorporation into the chlorination fluidised bed.

To maximise the effect of the present invention the process is, preferably, operated on a continuous basis the flows of ore and carbon being continuously preheated and the hot mixture of ore and carbon being continuously passed to the chlorination fluidised bed. Preferably the solids movement from vessel to vessel is conducted by gravity flow. The process, in avoiding a chlorine liquefaction step lends itself to operation at elevated pressure which is preferably, at least 2 atmospheres gauge. Preferably that pressure is maintained in, at least the chlorine recovery vessel. Suitably, pressure of the oxygen introduced into the chlorine recovery fluidised bed is used as a source of pressure. In this manner the conservation of heat and energy desired is achieved.

In view of the need to avoid by-passing of the reaction zone such a continuous operation as described above is preferably accompanied by the use of a substantially upright baffle or baffles in the chlorination fluidised bed to impede the passage of insufficiently reacted material through the bed. Preferably the mixture of beneficiate and residual carbon, if any, is treated to remove the carbon which carbon may be recycled to the ore preheating treatment stage of the process where it may be mixed with sufficient further carbon to provide the source of heat for preheating, the source of any added heat for the ore chlorination, a reducing agent for oxygen combined with the iron removed from the ore by virtue of the chlorination and the source of heat for the revolatilisation of the iron chloride. The quantity of carbon introduced at the preheating stage is therefore, preferably from 25% to 60%, particularly preferably from 30% to 50% by weight of the ore and carbon.

Preferably the process according to the present invention is applied to ores in which the oxide present, of the metal which it is desired raise in content, in the ore beneficiate, has a Gibbs free energy of chlorination at least 10 kilocalories per mole of chlorine employed less negative than that of oxide of iron in the ore. The present invention is however, particularly advantageously, applicable to ores in which the oxide of the metal which it is desired to raise in content in the ore beneficiate has a Gibbs free energy of chlorination at least 15, particularly preferably, more than 20 kilocalories per mole of chlorine employed less negative than that of the oxide of iron in the ore that is to say a Gibbs free energy of chlorination less negative than $-35$ kilocalories per mole of chlorine when the said oxide of iron is ferrous oxide. Examples of particularly advantageous applications of this invention are to chromite ore to raise the content of chromium values therein, to tantalite or columbite ore to raise the content of tantalum and/or niobium values therein, to wolframite ore to raise the content of tungsten values therein and to bauxite to raise the content of alumina values therein. Very suitably the present invention may be utilised in relation to a mineral sand such as chromite sand, a coarse fraction of which may be particularly suitable for processing according to this invention. A product suitable for use in the manufacture of "ferrochrome" for which a chromium to iron ratio in the region of 2:1 or above may be sufficient may be produced according to the present invention which is, however, susceptible to operation to produce any desired degree of beneficiation for example even up to a chromium to iron ratio of 20:1 or above.

In the operation of the present invention, it will be appreciated, values of certain ore constituents may be removed with the iron values. A quantity of, for example, calcium, magnesium or zinc chlorides may form and become included with the iron chloride. This may represent a loss of chlorine from the process since such chlorides are not oxidised when the iron chloride is oxidised to recover the chlorine content thereof. A quantity of silicon chloride or aluminium chloride may likewise form and be removed although this does not represent a loss of chlorine since these chlorides may be oxidised, with the iron chloride, to release their chlorine. In the normal operation of this invention it may be necessary to take account of the presence of such other chlorides in the gaseous effluent from the fluidised bed due to their effect, for example, on the tendency of one or more constituents of the gaseous effluent to condense prematurely.

According to a modification thereof, the present invention may be applied to the removal of one or more metals other than iron from an oxide ore which may contain relatively little iron, or, even, substantially no iron, and, preferably, a lesser quantity of values of iron than values of the metal or metals other than the iron, the said removal being optionally together with iron values or in their absence. Preferably the constituent removed is present in at least 10%, preferably at least 15% and, particularly preferably, at least 20% expressed as the oxide and by weight of the ore and is, preferably, removed from the ore to the extent of at least 10% by weight of the ore.

This modification of the present invention may be particularly applied to the removal of, for example, one or more of boron, gallium, zirconium, thorium, aluminium, titanium, silicon, or uranium values from an oxidic ore either to increase the values of residual metals in the ore as a means for the recovery of the metal removed. Such a modification may be operated as a cyclic process involving the condensation of the chlorides in the gaseous effluent from the fluidised bed, the chlorination and oxidation of these chlorides and the recycle of the chlorine so released as is taught in relation to iron chloride hereinbefore. Optionally, specific metal values may be recovered separately by fractional condensation of the chlorides.

The present invention therefore further provides a beneficiation process characterised by the following combination of features:

(a) chlorinating values of a metal or metals other than iron, of the ore by forming a fluidised bed of particles of the ore in admixture with particles of carbon, the carbon being present in the fluidised bed in at least sufficient quantity to react with any oxygen added to or evolved from the fluidised bed and the temperature of the fluidised bed being from 800° C. to 1100° C., admitting to the fluidised bed a chlorine-containing gas giving a concentration of chlorine of from 20% to 60% by volume of gases added to the fluidised bed and reacting the chlorine with the values of the said other metal in the bed to produce the chloride of the said other metal, (b) condensing the chloride of the said other metal and separating the condensed chloride from the gaseous effluent from the fluidised bed, (c) revolatilising the condensed chloride, (d) contacting the revolatilised chloride with oxygen to oxidise the chloride with the evolution of chlorine, (e) recycling the chlorine so evolved, as chlorine-containing gas, to the fluidised bed.

It will be appreciated that in this modification of the invention the preferred partial oxidation of the chlorides in the gaseous effluent from the fluidised bed may not be appropriate if the chlorides in question are not capable of oxidation to a mixture of a higher chloride and oxide and/or are not capable of acting as a chlorine scavenger.

Preferably, the Gibbs free energy of chlorination of the oxide of the metal which it is desired to remove from the ore is at least 10 and, particularly preferably, at least 15 kilocalories, per mole of chlorine employed, more negative than that of the oxide of another metal which it is desired should remain and preferably is also at least as negative as $-25$ kilocalories per mole of chlorine employed. The chlorination step of the present invention gives an extremely sensitive selectivity of first chlorination and because of this, it is possible to utilise the invention to separate metal values even where the values remaining behind are normally chlorinatable where the values removed are more chlorinatable. It is possible therefore, depending on the make up of the ore or other material being treated and the manner of application of the process, that some values, eg those of aluminium silicon, titanium, chromium or vanadium could either be removed or remain behind. The Gibbs free energy of oxidation of the chloride of the metal which it is desired to remove from the ore preferably is more negative than $-10$ and, particularly preferably more negative than $-25$, kilocalories per mole of oxygen employed. Examples of applications of this aspect of the invention are to aluminosilicates to recover aluminium values therefrom and to beryl to recover beryllium values therefrom. Reference is made to "The thermochemical properties of the oxides, fluorides and chlorides to 2500° K." by A Glassner, published by the Argonne National Laboratory, for the determination of the values of the free energy of chlorination and of oxidation of metal oxides and chlorides.

The invention will now be illustrated by reference to the following examples of the operation of certain portions thereof in relation to certain ores.

EXAMPLE 1

This example demonstrates the beneficiation of wolframite by the removal of iron (and manganese) values therefrom.

The apparatus used comprised a vertical fused silica tube reactor of 150 mm nominal bore having a conical base section to act as gas distributor and a horizontal outlet at the top of the reactor connected to a cooled cyclone. A gas inlet was provided in the top section of the reactor.

15 kg of wolframite ore having a particle size range of 44 to 200 microns was co-fluidised in the reactor with petroleum coke having a particle size range of from 80 to 600 microns the fluidisation being achieved by means of an inflow through the base section of the reactor of 28 $l.m^{-1}$ of nitrogen. The resulting fluidised bed of ore was heated by external means and maintained at a temperature of 980° to 1000° C. Nitrogen was passed into the top section of the reactor via the inlet provided at a rate of 57 $l\ m^{-1}$.

The chlorination of the ore was conducted by replacing a part of the fluidising inflow of nitrogen by a quantity of chlorine sufficient to bring the chlorine content of the mixed gases up to 20% by volume and was continued until 1.09 $m^3$ of chlorine had been passed into the fluidised bed after which time the fluidisation was continued with nitrogen alone and the bed allowed to cool. Samples of solids were taken from the reactor at intervals during the process. During the chlorination the flow of nitrogen into the top section of the reactor was continued to ensure that the gaseous effluent was rapidly cooled to below the melting point of ferrous and manganous chlorides present therein to prevent accretions of these chlorides forming. This example does not therefore illustrate the chlorine recovery aspects of the present invention. The condensed chlorides were recovered in the cooled cyclone and were found to contain ferrous and ferric chlorides in a molar ratio of 17:1. When the bed was recovered from the reactor at the end of the process and separated into beneficiated ore and coke the beneficiated ore consisted of black particles which on heating to 900° C. in air turned to a yellow colour. A similar heating of the original ore caused the ore to turn to a purple black colour. When samples of the bed material which had been taken at intervals throughout the process were treated similarly it was found that there was a gradation with reaction time of the formation of the yellow colour indicating that reaction occurs more or less uniformly through the ore particle rather than beginning at the surface. Partial analysis of the original and the beneficiated ores were found to give the following proportions by weight.

TABLE 1

|  | Original Ore | Beneficiated Ore |
|---|---|---|
| W expressed as % $WO_3$ | 71.2 | 88.1 |
| Fe expressed as % $Fe_2O_3$ | 12.1 | 0.3 |
| Mn expressed as % MnO | 12.1 | 0.6 |

EXAMPLE 2

This example illustrates the beneficiation of bauxite by the removal of iron values therefrom but does not include the recovery of chlorine from the iron chloride formed.

Using the same apparatus as in Example 1, 33 kg of uncalcined Ghanian bauxite was fluidised using a nitrogen inflow of 35 l m$^{-1}$ and then the resulting fluidised bed was heated to 600° C. by means of external heating. The bauxite particles were in the size range 106 to 600 microns 6 kg petroleum coke having particle size range of from 90 to 1800 microns was added to the fluidised bed which was then heated to and maintained within the temperature range of 860° C. to 890° C.

The chlorination of the ore was conducted by replacing 30% of the nitrogen flow by chlorine. After 160 minutes the flow of chlorine gas was stopped while the nitrogen flow was continued and the bed allowed to cool. The bed was then separated into beneficiated ore and residual coke fractions. Analysis of the original ore, the calcined original ore and the beneficiated ore gave the following results.

TABLE 2

|  | Original Ore | Calcined Ore | Beneficiated Ore |
|---|---|---|---|
| $Al_2O_3$ % wt. | 53.8 | 74.3 | 93.5 |
| $Fe_2O_3$ % wt. | 14.8 | 21.9 | 1.5 |

EXAMPLE 3

This example illustrates the beneficiation of chromite ore by the removal of iron values therefrom and illustrates the partial oxidation of the iron chloride produced but not the recovery of chlorine therefrom.

The apparatus used was as described in Example 1. 24 kg of Chromite ore of which substantially all the particles were in the size range 106 to 250 microns and 6 kg of petroleum coke of which substantially all the particles were in the size range 90 to 1800 microns were co-fluidised in the reactor by means of a nitrogen input of 36 l m$^{-1}$. The fluidised bed was heated and its temperature maintained in the range of 950° C. to 980° C. by external heating of the reactor. Air flowing at a rate of 17 l m$^{-1}$ was admitted to the top section of the reactor to oxidise the majority, but not all, of the ferrous chloride in the effluent gases from the fluidised bed to produce a mixture of ferric chloride and ferric oxide.

The chlorination reaction was accomplished by substituting 44% by volume of the fluidising nitrogen flow by chlorine and increasing the flow of combined gases into bed to 37 l m$^{-1}$. The chlorination was continued for 150 minutes. After this time flow of chlorine gas was stopped while the nitrogen flow was continued and the bed allowed to cool. The bed was then separated into beneficiated ore and residual coke. The beneficiated ore was analysed to give the following results.

TABLE 3

|  | Initial Ore | Treated Ore |
|---|---|---|
| Cr % wt | 30.2 | 40.5 |
| Fe % wt | 20.1 | 1.6 |

An ore sample removed only a few minutes after the chlorination had begun showed a green colour showing that the reaction had started at the outside of the particles and would gradually move towards the centre of the particles. The solids collected in the cooled cyclone were analysed to give 16.3% $FeCl_2$ 49.3% $FeCl_3$ and 5.1% $Fe_2O_3$ by weight demonstrating the partial but not complete oxidation of the ferrous chloride present.

When a similar process to that described above was conducted without the partial oxidation of the iron chloride in the gaseous effluent from the fluidised bed that chloride, when condensed and recovered in the cooled cyclone, showed a ratio of ferrous chloride to ferric chloride of 18:1 indicating that the desired conversion of the iron values in the ore predominantly to ferrous chloride was being achieved at the chlorination stage of the process.

EXAMPLE 4

This illustrates the practicability of the volatilisation of iron chloride on a fluidised bed.

Using the reactor described in Example 1 a bed consisting of 16 kg of refractory sand and 4 kg of petroleum coke was fluidised with nitrogen flowing at a rate of 49 l m$^{-1}$. The sand particles were substantially in the size range 60 to 220 microns and the coke particles were substantially in the size range 90 to 1800 microns.

The bed was heated by external means to approximately 950° C. and its temperature allowed to stabilise.

The fluidising gas was changed to air flowing at the same rate and immediately the feeding of iron chloride, by dropping it onto the top of the bed, was started at a mean rate of 315 g per minute. The iron chloride had been prepared by the chlorination of a titaniferous ore to produce a vapour stream containing iron chloride predominantly in the form of ferrous chloride followed by the oxidation, as taught herein, of the majority only of that ferrous chloride to a mixture of ferric chloride and ferric oxide.

No change in the temperature of the bed was noted and it is deduced from this that the rate of excess heat production by the combustion of coke in air in the bed was the same as the heat absorbed by iron chloride in the bed and that iron chloride was not being retained in the bed.

When vaporous iron chloride as so produced is immediately contacted with oxygen it immediately commences to react to produce iron oxide and to release the chlorine content thereof in high yield as known to those in the art.

EXAMPLE 5

This example illustrates the removal of metals other than iron from an ore. Some of the metals for example silicon and aluminium are oxidisable to recover chlorine therefrom.

Ore having the composition, by weight, of:
30.2% Cr($Cr_2O_3$ 44.1%)
22.6% FeO
3.6% $Fe_2O_3$
15.8% $Al_2O_3$
8.7% MgO
1.6% $SiO_2$
0.21% MnO
0.12% CaO was introduced into a reaction chamber similar to that described in Example 1 and preheated in the fluidised state in the presence of a flow of 36 l min$^{-1}$ air for 30 min. Coke was added and then fluidisation with 33% chlorine in nitrogen mixture was started, initiated and maintained for 180 minutes. The final product contained 40.5% Cr; and 1.6% Fe (both present as oxides); 19.7% $Al_2O_3$; 9.1% MgO; 1.8% $SiO_2$; 0.12% CaO and 0.01% MnO. 94% of the iron, 95% of the manganese, 19% of the silicon, 25% of the calcium and 22% of the magnesium, had been removed from the ore.

We claim:

1. A process for the beneficiation of an iron-containing oxidic material, which comprises;
   (a) chlorinating iron values of the material by forming a fluidised bed of particles of the material in admixture with particles of carbon, the carbon being present in the fluidised bed in at least sufficient quantity to react with any oxygen added to or evolved in the bed, and the temperature of the fluidised bed being from 800° C. to 1100° C., admitting to the fluidised bed a chlorine containing gas giving a concentration of chlorine of from 20% to 60% by volume of gases added to the bed and reacting the chlorine with iron values present in the ore to produce iron chloride predominantly in the form of ferrous chloride,
   (b) contacting the gaseous effluent from the fluidised bed in which iron values in the material have been chlorinated; hereafter referred to as the chlorination fluidised bed; the said effluent containing the said ferrous chloride in vapour form, with a quantity of oxygen controlled to oxidise more than 50% but less than 100% on a molar basis, of the ferrous chloride in the effluent according to the equation $3FeCl_2 + 0.75O_2 = 0.5Fe_2O_3 + 2FeCl_3$ to produce a mixture of iron chloride and ferric oxide
   (c) condensing iron chloride contained in the said mixture and separating the condensed iron chloride from the gaseous effluent from the fluidised bed,
   (d) revolatilising condensed iron chloride,
   (e) contacting revolatilised iron chloride with oxygen to oxidise the iron chloride so contacted to ferric oxide with the evolution of chloride and
   (f) recycling chlorine so evolved, as chlorine containing-gas, to the chlorination fliuidised bed.

2. A process as claimed in claim 1 wherein the quantity of carbon in the chlorination fluidised bed is from 20% to 40% by weight of the ore and carbon.

3. A process as claimed in claim 1 wherein the concentration of chlorine in the chlorine containing gas is from 20% to 50% by volume.

4. A process as claimed in claim 1 wherein oxygen is introduced into the chlorination fluidised bed in a quantity of not more than 15% by volume of the total gaseous input into the bed.

5. A process as claimed in claim 1 wherein the expanded depth of the chlorination fluidised bed is from 1 to 2.75 meters.

6. A process as claimed in claim 1 wherein the oxidation is conducted by passing air into the free space above the chlorination fluidised bed.

7. A process as claimed in claim 1 wherein the iron chloride is revolatilised in contact with hot gases derived from the combustion of carbon by means of oxygen, the oxygen containing a quantity of inert gases controlled to be below that obtaining in air.

8. A process as claimed in claim 7 wherein the iron chloride to be revolatilised is introduced into the free space above a fluidised bed in which the carbon in admixture with an inert material, is combusted.

9. A process as claimed in claim 8 wherein the oxidation of the revolatilised iron chloride is initiated at least in part, by passing an oxygen-containing gas into the free space above the fluidised bed in which the carbon is combusted.

10. A process as claimed in claim 1 wherein the iron chloride is revolatilised in contact with gases having a temperature of from 800° C. to 1100° C.

11. A process as claimed in claim 1 wherein iron chloride is passed into the free space above the chlorination fluidised bed to assist in the control of heat therein.

12. A process as claimed in claim 1 wherein the ore is preheated by contacting it with combustion gases produced by the combustion of carbon by means of air.

13. A process as claimed in claim 12 wherein the carbon contains volatile matter which is consumed or removed in the course of the combustion.

14. A process as claimed in claim 1 wherein the revolatilisation of the iron chloride is conducted at a pressure of at least 1.5 bars above atmospheric pressure.

15. A process as claimed in claim 14 wherein the chlorination of the ore is conducted under a superatmospheric pressure derived from the pressurisation of the revolatilisation stage of the process.

16. A process as claimed in claim 1 wherein the material is one which, in addition to oxide of iron, contains one or more oxides of titanium, vanadium, niobium, tantalum, molybdenum, chromium, tungsten, or nickel the content of which is increased in the course of the process.

17. A process as claimed in claim 1 wherein the material in addition to oxides of iron contains one or more other oxides which are removed in the course of the process.

18. A process as claimed in claim 1 wherein a metal other than iron is present in the material and is chlorinated in the step (a), the chloride carried through step (b), condensed and separated in step (c), revolatilized and oxidized to obtain the corresponding oxide.

19. A process as claimed in claim 18 wherein the metal other than iron is selected from the group consisting of boran, gallium, zirconium, thorium, aluminum, silicon and uranium.

* * * * *